US012620681B2

(12) United States Patent
Park

(10) Patent No.: US 12,620,681 B2
(45) Date of Patent: May 5, 2026

(54) BATTERY

(71) Applicant: Samsung SDI Co., Ltd., Yongin-si (KR)

(72) Inventor: Sanghun Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1018 days.

(21) Appl. No.: 17/658,962

(22) Filed: Apr. 12, 2022

(65) Prior Publication Data

US 2022/0328946 A1 Oct. 13, 2022

(30) Foreign Application Priority Data

Apr. 13, 2021 (KR) ........................ 10-2021-0048018

(51) Int. Cl.
H01M 50/588 (2021.01)
H01M 50/531 (2021.01)

(52) U.S. Cl.
CPC ....... H01M 50/588 (2021.01); H01M 50/531 (2021.01)

(58) Field of Classification Search
CPC ............. H01M 50/588; H01M 50/181; H01M 50/503; H01M 50/533; H01M 50/559; H01M 50/109; H01M 50/107; H01M 50/59
See application file for complete search history.

(56) References Cited

U.S. PATENT DOCUMENTS

2014/0242451 A1* 8/2014 Sawayama ........... H01M 50/119
429/163

FOREIGN PATENT DOCUMENTS

| | | | |
|---|---|---|---|
| CN | 103219477 A | 7/2013 | |
| CN | 103956454 A | 7/2014 | |
| JP | 2001-185122 A | 7/2001 | |
| JP | 2021-005457 A | 1/2021 | |
| KR | 20-0129264 Y1 | 12/1998 | |
| KR | 10-2009-0008087 A | 1/2009 | |
| KR | 2014139793 A | * 12/2014 | ............. H01M 2/30 |
| KR | 20140139793 A | * 12/2014 | ......... H01M 50/543 |
| KR | 2018007298 A | * 1/2018 | ........... H01M 10/04 |

OTHER PUBLICATIONS

Lv et al., Cn 103219477A Espacenet machine translation, 2013 (Year: 2013).*
Cho, KR-20140139793-A, Espacenet machine translation, 2014 (Year: 2014).*
Chinese Notification of First Office Action, for Patent Application No. 202210385596.6, issued Dec. 29, 2023, 13 pages.

* cited by examiner

*Primary Examiner* — Adam A Arciero
(74) *Attorney, Agent, or Firm* — Womble Bond Dickinson (US) LLP

(57) ABSTRACT

A battery includes a cell including an electrode, an electrode tab connected to the electrode, and a dummy tab protruding outwardly from the cell farther than the electrode tab. The dummy tab prevents a short circuit between first and second electrodes of the cell to prevent an accident, such as an overcurrent, overheating, and fire.

29 Claims, 5 Drawing Sheets

BATTERY

CROSS-REFERENCE TO RELATED APPLICATION

This application claims priority to and the benefit of Korean Patent Application No. 10-2021-0048018, filed on Apr. 13, 2021, in the Korean Intellectual Property Office, the disclosure of which is incorporated by reference herein in its entirety.

BACKGROUND

1. Field

Aspects of embodiments of the present disclosure relate to a battery.

2. Description of the Related Art

Generally, secondary (or rechargeable) batteries refer to batteries that are designed to be repeatedly discharged and recharged, different from non-rechargeable (or primary) batteries. Secondary batteries are used as energy sources of devices such as mobile devices, electric vehicles, hybrid vehicles, electric bicycles, or uninterruptible power supplies. Secondary batteries may be used individually or in secondary battery modules including a plurality of secondary batteries connected together according to the type of external device to be powered.

SUMMARY

Embodiments of the present disclosures include a battery configured to prevent a short circuit between first and second electrodes to prevent accidents, such as an overcurrent, overheating, and fire.

Additional aspects and features of the present disclosure will be set forth, in part, in the description which follows and, in part, will be apparent from the description or may be learned by practice of the described embodiments of the present disclosure.

According to an embodiment of the present disclosure, a battery includes: a cell including an electrode; an electrode tab connected to the electrode; and a dummy tab protruding outwardly from the cell farther than the electrode tab.

The cell may include first and second electrodes respectively on first and second surfaces, which may be opposite each other in a first direction.

The electrode tab may include first and second electrode tabs respectively connected to the first and second electrodes.

The dummy tab may protrude outwardly from the cell farther than the first and second electrode tabs.

The dummy tab may extend parallel with the first and second electrode tabs in a second direction crossing the first direction, and the dummy tab may protrude outwardly from the cell in the second direction farther than the first and second electrode tabs.

The dummy tab may be on at least one of the first surface and the second surface.

The dummy tab may be on the first surface or the second surface together with the first electrode tab or the second electrode tab.

The first electrode may be at a center position of the first surface, and the second electrode may be entirely on the second surface and a lateral surface extending between the first and second surfaces and may extend from the lateral surface to a peripheral region extending around a periphery of the center position of the first surface.

The dummy tab may be on the second surface together with the second electrode tab.

The first and second electrode tabs and the dummy tab may each have an outer end portion, which are respectively provided at different heights in the first direction.

The outer end portion of the second electrode tab may be at a height between the outer end portion of the first electrode tab and the outer end portion of the dummy tab in the first direction.

The outer end portions of the first and second electrode tabs and the dummy tab may protrude outwardly from the cell in parallel with each other.

The second electrode tab may include: a first bent portion bent at a position away from the second surface along a lateral surface of the cell in the first direction toward the first surface; and a second bent portion on the lateral surface of the cell together with the first bent portion and bent in a second direction to form the outer end portion of the second electrode tab at a height between the first surface and the second surface.

The first and second electrode tabs respectively may include: first and second coupling portions coupled to the first and second surfaces; and first and second lead-out portions extending outwardly of the cell from the first and second coupling portions.

The first and second coupling portions and the first and second lead-out portions may extend in different directions.

The dummy tab may include a pair of dummy tabs on both sides of the second lead-out portion.

The dummy tab and the lead-out portion of the second electrode tab may extend in parallel with each other, and the dummy tab may be shorter than the second lead-out portion.

The dummy tab may be on the second surface of the cell together with the second electrode tab, and the second electrode tab further may include a fixing portion protruding from the second coupling portion toward the dummy tab.

The dummy tab and the fixing portion may be arranged in a line, and the dummy tab and the fixing portion may be separated by a separation gap.

The dummy tab may be fixed to the second surface of the cell by a fixing member that is attached to the second surface across a portion of the dummy tab, a portion of the second lead-out portion, and a portion of the fixing portion.

BRIEF DESCRIPTION OF THE DRAWINGS

The above and other aspects and features of the present disclosure will be more apparent from the following description taken in conjunction with the accompanying drawings, in which.

DETAILED DESCRIPTION

Figure 1:
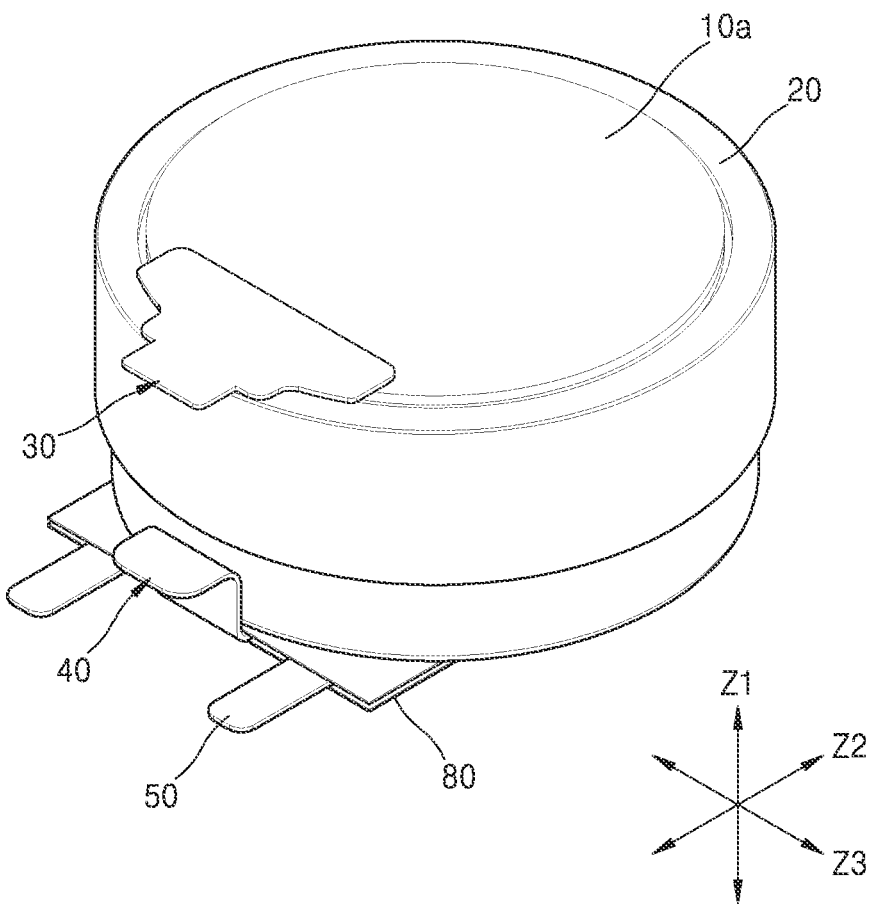
FIG. 1 is a perspective view of a battery according to an embodiment.

Reference will now be made, in detail, to embodiments, examples of which are illustrated in the accompanying drawings. In this regard, the presented embodiments may have different forms and should not be construed as being limited to the descriptions set forth herein. Accordingly, embodiments are merely described below, by referring to the figures, to explain aspects and features of the present description. As used herein, the term "and/or" includes any and all combinations of one or more of the associated listed items. Expressions, such as "at least one of," when preceding a list of elements, modify the entire list of elements and do not modify the individual elements of the list.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. Further, the use of "may" when describing embodiments of the present disclosure relates to "one or more embodiments of the present disclosure." As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Hereinafter, a battery will be described according to embodiments with reference to the accompanying drawings.

Figure 2:
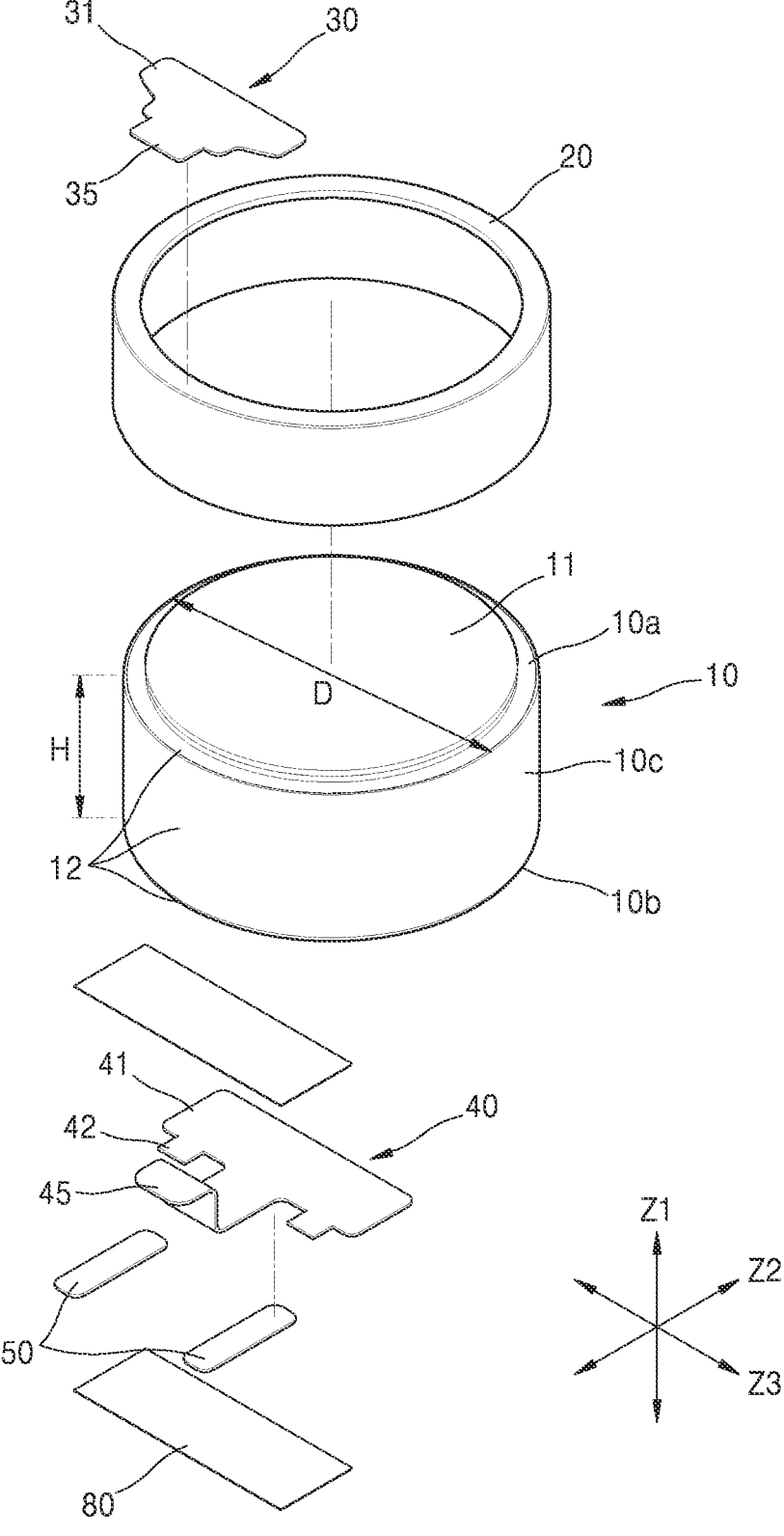
FIG. 2 is an exploded perspective view of the battery shown in FIG. 1.
Figure 3:
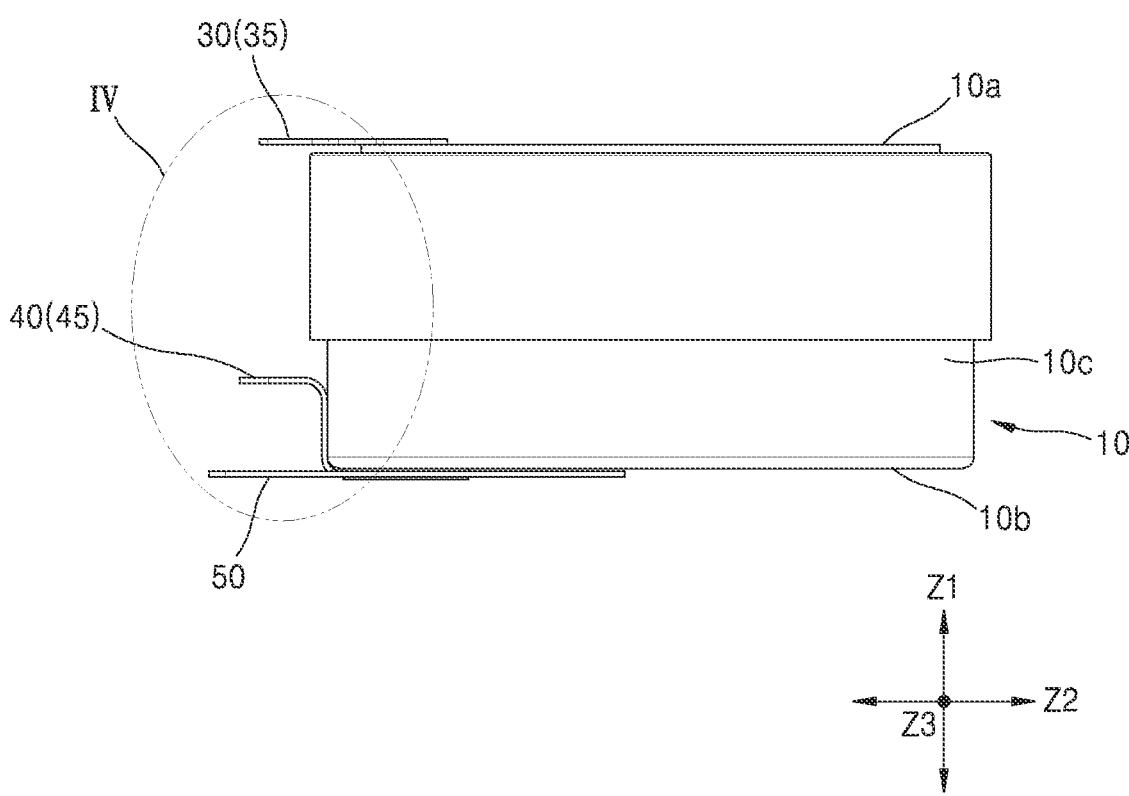
FIG. 3 is a side view of the battery shown in FIG. 1.
Figure 4:
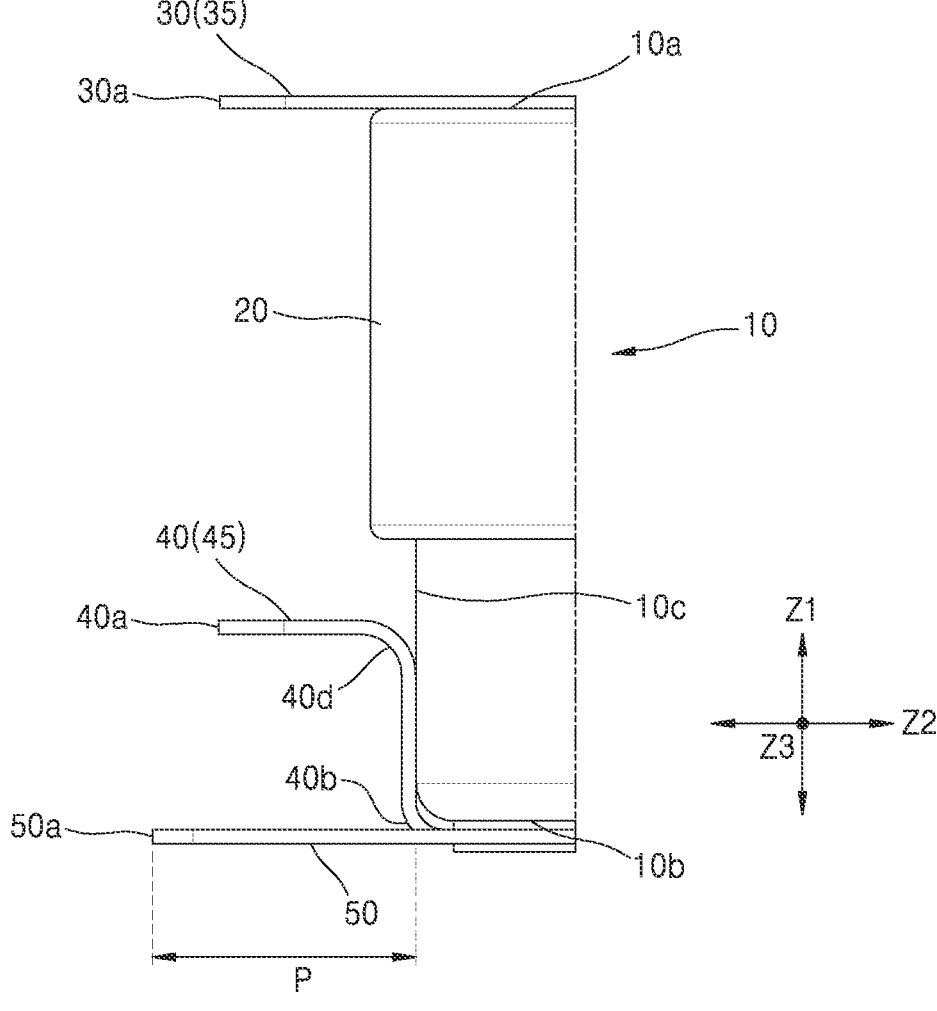
FIG. 4 is an enlarged view of the portion IV of FIG. 3.
Figure 5:
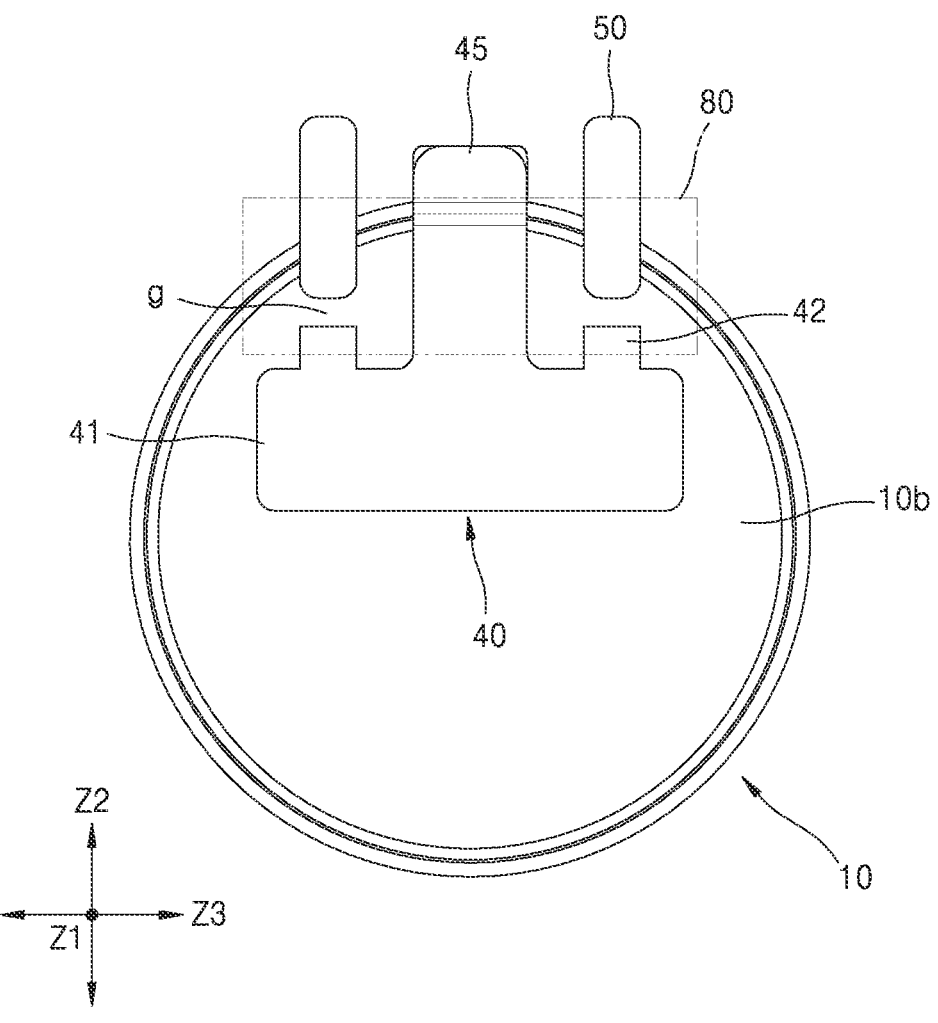
FIG. 5 is a view of a second surface of the battery shown in FIG. 1.

FIG. 1 is a perspective view of a battery according to an embodiment; FIG. 2 is an exploded perspective view of the battery shown in FIG. 1; FIG. 3 is a side view of the battery shown in FIG. 1; FIG. 4 is an enlarged view of the portion IV of FIG. 3; and FIG. 5 is a view of a second surface side of the battery shown in FIG. 1.

Referring to FIGS. 1 to 4, according to an embodiment, the battery may include: a cell 10; first and second electrode tabs 30 and 40 connected to first and second electrodes 11 and 12 of the cell 10; and dummy tabs 50 protruding toward the outside of the cell 10 more than (or farther than) the first and second electrode tabs 30 and 40.

Referring to FIG. 2, the cell 10 may have first and second surfaces 10a and 10b, which are opposite each other in a first direction Z1, and a lateral surface 10c, which connects (or extends between) the first and second surfaces 10a and 10b to each other. The first and second surfaces 10a and 10b and the lateral surface 10c of the cell 10 may substantially form first and second surfaces and a lateral surface of the battery. Thus, in the present specification, the first and second surfaces 10a and 10b and the lateral surface 10c may be referred to as the first and second surfaces 10a and 10b and the lateral surface 10c of the battery or the first and second surfaces 10a and 10b and the lateral surface 10c of the cell 10.

According to an embodiment, the lateral surface 10c may form a circumferential surface connecting (or extending between) the first and second surfaces 10a and 10b to each other. In an embodiment, the first and second surfaces 10a and 10b may have a circular shape. For example, according to an embodiment, the cell 10 may have a slim shape such that the height H of the cell 10 in the first direction Z1 may be less than other dimensions (e.g., the diameter D of the first surface 10a). For example, according to an embodiment, the cell 10 may have a slim cylindrical shape such that the height H of the cell 10 is less than the diameter D of the first surface 10a. For example, the aspect ratio of the cell 10, that is, the ratio of the height H of the cell 10 to the diameter D of the first surface 10a, may be within a range of about 5.4:12 to about 5.4:14. In an embodiment, when the aspect ratio is less than about 5.4:12, the height of a cell mounting space of a device which is to use (and/or accommodate) the cell 10 as a power source may increase, and thus, the aspect ratio may be a limiting factor that makes it difficult to reduce the height of the set device. Conversely, when the aspect ratio is greater than about 5.4:14, the aspect ratio of an electrode assembly accommodated in the cell 10 may be excessively increased, thereby decreasing the energy efficient per unit volume of the cell 10 or increasing manufacturing costs of the electrode assembly due to the excessively large aspect ratio of the electrode assembly. Therefore, in an embodiment, the aspect ratio of the cell 10, that is, the ratio of the height H of the cell 10 to the diameter D of the first surface 10a of the cell 10, may be adjusted to be within the range of about 5.4:12 to about 5.4:14.

The first and second electrodes 11 and 12, which have opposite polarities, may be respectively formed on the first and second surfaces 10a and 10b of the cell 10. For example, the first electrode 11 may be formed at a center position of the first surface 10a, and the second electrode 12 may be formed on the entirety of the second surface 10b and the entirety of the lateral surface 10c and may extend from the lateral surface 10c to a peripheral region surrounding (or extending around) the center position of the first surface 10a. Both the first and second electrodes 11 and 12 may be formed together (or present together) on the first surface 10a at different positions. For example, the first electrode 11 may be formed at the center position of the first surface 10a, and the second electrode 12 may be formed at a peripheral position of the first surface 10a. In such an embodiment, the first and second electrodes 11 and 12 may be formed on the first surface 10a such that the first and second electrodes 11 and 12 are spaced apart from each other and/or are electrically insulated from each other with an insulating member therebetween.

The first surface 10a of the cell 10 may be covered with an insulating cap 20 to electrically insulate the second electrode 12 formed around the first electrode 11 while allowing electrical connection the first electrode 11, which is exposed through a center opening in the insulating cap 20. In an embodiment, electrical connection to the first electrode 11 may be made through the first surface 10a of the cell 10, and electrical connection to the second electrode 12 may be made through the second surface 10b of the cell 10. In such an embodiment, although the first electrode 11 forming an electrical connection through the first surface 10a is exposed on the first surface 10a, the second electrode 12 may not be exposed on the first surface 10a of the cell 10. To this end, the peripheral region of the first surface 10a may be covered with the insulating cap 20 such that the second electrode 12 formed in the peripheral region of the first surface 10a may not be exposed on the first surface 10a.

The first electrode tab 30 may be formed on the first surface 10a of the cell 10 and may be electrically connected to the first electrode 11. The first electrode tab 30 may be coupled to the center position of the first surface 10a of the cell 10 such that the first electrode tab 30 may be electrically connected to the first electrode 11. For example, the first electrode tab 30 may include a first coupling portion 31, which is coupled to the first electrode 11, and a first lead-out portion 35, which extends from (e.g., extends forward from) the first coupling portion 31 in a second direction Z2. In an embodiment, the first coupling portion 31 and the first lead-out portion 35 may extend in directions crossing each other, and thus, the first electrode tab 30 may have a T-shape as a whole. For example, the first coupling portion 31 may extend in a third direction Z3, and the first lead-out portion 35 may extend in the second direction Z2. Throughout the present specification, the second direction Z2 may refer to a direction crossing the first direction Z1, for example, a direction perpendicular to the first direction Z1. In addition, throughout the present specification, the third direction Z3 may refer to a direction crossing the first and second directions Z1 and Z2, for example, a direction perpendicular to the first and second directions Z1 and Z2. The first direction Z1 may correspond to the height direction of the cell 10, and the second and third directions Z2 and Z3 may refer to directions crossing each other and parallel to the first surface 10a and/or the second surface 10b of the cell 10.

The first lead-out portion 35 of the first electrode tab 30 may extend in the second direction Z2 and form a charge-discharge path of the cell 10. For example, the first lead-out portion 35 may form the charge-discharge path toward the outside of the cell 10 while extending to the outside of (e.g., while extending beyond a periphery of) the cell 10 in the second direction Z2, and in such an embodiment, the first lead-out portion 35 may extend in the second direction Z2 toward the outside of the cell 10 away from the first surface 10a of the cell 10.

The first coupling portion 31 of the first electrode tab 30 may form an electrical connection with the cell 10 and may be coupled to the first surface 10a of the cell 10. For example, the first coupling portion 31 of the first electrode tab 30 may be welded to the first surface 10a by a laser. The first coupling portion 31 of the first electrode tab 30 may be formed on the first surface 10a in a state in which the first coupling portion 31 is entirely arranged on the first surface 10a without departing from (or extending off of or beyond) the first surface 10a. The first coupling portion 31 may extend in the third direction Z3 on the first surface 10a of the cell 10 such that the first coupling portion 31 may have a sufficient length in the third direction Z3 to provide a sufficient coupling area with the first surface 10a.

The first coupling portion 31 of the first electrode tab 30 may extend in the third direction Z3 crossing the first lead-out portion 35, which extends in the second direction Z2, and because the first coupling portion 31 extends in a direction crossing the first lead-out portion 35, the first coupling portion 31 may effectively resist twisting, which may otherwise cause the first coupling portion 31 to depart from the first surface 10a of the cell 10 such that separation of the first coupling portion 31 from the first surface 10a may be effectively mitigated or prevented. For example, the first coupling portion 31 may extend in the third direction Z3 to (or beyond) both sides of the first lead-out portion 35 such that the first coupling portion 31 extending to both sides of the first lead-out portion 35 may effectively resist an external twisting moment acting on the first lead-out portion 35 (axis of moment) by providing a reverse resistance moment, which resists the external twisting moment acting on the first lead-out portion 35 (axis of moment). For example, a twisting moment may act on the first lead-out portion 35 (axis of moment) of the first electrode tab 30, which extends in the second direction Z2, away from the cell 10, and the first coupling portion 31, formed on both sides of the first lead-out portion 35, may provide a reverse resistance moment, which acts on the first lead-out portion 35 (axis of moment) to resist against such an external twisting moment.

The second electrode tab 40 may be formed on the second surface 10b of the cell 10. The second electrode tab 40 may be electrically connected to the second electrode 12 of the cell 10 and may be coupled to the second surface 10b. For example, the second electrode tab 40 may include a second coupling portion 41, which is coupled to the second electrode 12, and a second lead-out portion 45, which extends (e.g., which extends forward) from the second coupling portion 41 in the second direction Z2. In an embodiment, the second coupling portion 41 and the second lead-out portion 45 may extend in directions crossing each other. For example, the second coupling portion 41 may extend in the third direction Z3, and the second lead-out portion 45 may extend in the second direction Z2. In an embodiment, the first and second lead-out portions 35 and 45 of the first and second electrode tabs 30 and 40 may extend parallel to each other in the second direction Z2, and the first and second coupling portions 31 and 41 of the first and second electrode tabs 30 and 40 may extend parallel to each other in the third direction Z3. In various other embodiments, the first and second lead-out portions 35 and 45 of the first and second electrode tabs 30 and 40 may form the charge-discharge path toward the outside of the cell 10 while extending in different directions, and the first and second coupling portions 31 and 41 of the first and second electrode tabs 30 and 40 may extend in different directions and may be coupled to the first and second surfaces 10a and 10b of the cell 10. In an embodiment, the first electrode tab 30, which includes the first lead-out portion 35 and the first coupling portion 31 extending in directions crossing each other, may be oriented in a direction different from the orientation direction of the second electrode tab 40, which includes the second lead-out portion 45 and the second coupling portion 41 extending in directions crossing each other. For example, the first and second electrode tabs 30 and 40 may not be oriented in parallel to each other.

The second lead-out portion 45 of the second electrode tab 40 may extend in the second direction Z2 and form the charge-discharge path of the cell 10. For example, the second lead-out portion 45 may form the charge-discharge path toward the outside of the cell 10 while extending to the outside of the cell 10 in the second direction Z2, that is, while extending in the second direction Z2 to the outside of (e.g., beyond a periphery of) the cell 10 away from the second surface 10b of the cell 10.

The second coupling portion 41 of the second electrode tab 40 may form an electrical connection with the cell 10 and may be coupled to the second surface 10b of the cell 10. For example, the second coupling portion 41 of the second electrode tab 40 may be welded to the second surface 10b by a laser. The second coupling portion 41 of the second electrode tab 40 may be formed on the second surface 10b in a state in which the second coupling portion 41 is entirely arranged on the second surface 10b without departing from (or extending beyond) the second surface 10b. The second coupling portion 41 may extend in the third direction Z3 on the second surface 10b of the cell 10 such that the second coupling portion 41 may have a sufficient length in the third direction Z3 to provide a sufficient coupling area with the second surface 10b.

The second coupling portion 41 of the second electrode tab 40 may extend in the third direction Z3 crossing the second lead-out portion 45, which extends in the second direction Z2, such that the second electrode tab 40 may have a T-shape as a whole. Because the second coupling portion 41 extends in a direction crossing the second lead-out portion 45 as described above, the second coupling portion 41 may effectively resist twisting, which may otherwise cause the second coupling portion 41 to depart from the second surface 10b of the cell 10 such that separation of the second coupling portion 41 from the second surface 10b may be effectively mitigated or prevented. For example, the second coupling portion 41 may extend in the third direction Z3 to both sides (or beyond both sides) of the second lead-out portion 45 such that the second coupling portion 41 extending to both sides of the second lead-out portion 45 may effectively resist an external twisting moment acting on the second lead-out portion 45 (axis of moment) and may provide a reverse resistance moment to resist an external twisting moment acting on the second lead-out portion 45 (axis of moment).

In an embodiment, the dummy tabs 50 may be formed on at least one of the first and second surfaces 10a and 10b of the cell 10. In various embodiments, the dummy tabs 50 may be formed on the first and second surfaces 10a and 10b of the cell 10 together with the first and second electrode tabs 30 and 40, or may be formed on the first surface 10a or the second surface 10b together with any one of the first and second electrode tabs 30 and 40. Hereinafter, a structure in which the dummy tabs 50 are formed on the second surface 10b of the cell 10 will be primarily described. However, the dummy tabs 50 may be formed on the first surface 10a of the cell 10 or may be formed on both the first and second surfaces 10a and 10b of the cell 10.

Referring to FIGS. 2 and 4, the dummy tabs 50 may be formed on the second surface 10b of the cell 10 together with the second electrode tab 40. The dummy tabs 50 may extend in the second direction Z2 on the second surface 10b of the cell 10 and may protrude in the second direction Z2 toward the outside of (or beyond the periphery of) the cell 10 more than (or farther than) the second electrode tab 40. Through the present specification, the expression "the dummy tabs 50 protrude toward the outside of the cell 10 more than the first electrode tab 30 or the second electrode tab 40" may, for example, indicate that the outwardly protruding length of the dummy tabs 50 outside the cell 10 is relatively great (see, e.g., the protruding length P of the dummy tabs 50 shown in FIG. 4), rather than meaning that the length (e.g., the overall length) of the dummy tabs 50 in the second direction Z2 is relatively great. As described above, even when the dummy tabs 50 protrude toward the outside of the cell 10 more than the first electrode tab 30 or the second electrode tab 40 (see, e.g., the protruding length P of the dummy tabs 50 shown in FIG. 4), the length of the dummy tabs 50 in the second direction Z2 may be less than the length of the first electrode tab 30 or the length of the first lead-out portion 35 in the second direction Z2 or may be less than the length of the second electrode tab 40 or the length of the second lead-out portion 45 in the second direction Z2. For example, the first and second lead-out portions 35 and 45, extending in the second direction Z2 from the first and second coupling portions 31 and 41, may be longer than the dummy tabs 50, but the dummy tabs 50 may extend from positions relatively close to the outside of the cell 10 to protrude toward the outside of the cell 10 more than the first and second lead-out portions 35 and 45 (see, e.g., the protruding length P of the dummy tabs 50 shown in FIG. 4).

In various embodiments, the dummy tabs 50 may protrude toward the outside of the cell 10 more than (or farther than) the first electrode tab 30 or the second electrode tab 40. The dummy tabs 50 may extend in the second direction Z2 in parallel with the first electrode tab 30 or the second electrode tab 40, or may extend in a direction not parallel with the first electrode tab 30 or the second electrode tab 40. In other embodiments, the dummy tabs 50 extend radially from the center position of the cell 10 in directions other than the second direction Z2 as long as the dummy tabs 50 extend away from the center of the cell 10 more than the first electrode tab 30 or the second electrode tab 40, that is, the dummy tabs 50 protrude toward the outside of the cell 10 more than the first electrode tab 30 or the second electrode tab 40.

The dummy tabs 50 may protrude toward the outside of the cell 10 more than the second electrode tab 40. In such an embodiment, the dummy tabs 50 may extend in the second direction Z2 in parallel with the second electrode tab 40 and may protrude toward the outside of the cell 10 away from the second surface 10b similar to the second electrode tab 40. Because the dummy tabs 50 protrude toward the outside of the cell 10 more than the second electrode tab 40 (see, e.g., the protruding length P of the dummy tabs 50 shown in FIG. 4), the risk of electric conduction or a short circuit caused by an approaching external conductor may be reduced.

In an embodiment, the dummy tabs 50 may protrude away from the cell 10, that is, toward (and beyond) the outside of the cell 10, in the second direction Z2 in parallel with the first and second electrode tabs 30 and 40. The dummy tabs 50 may protrude toward the outside of the cell 10 more than (or may protrude farther outside of the cell 10 than) the first and second electrode tabs 30 and 40 (see, e.g., the protruding length P of the dummy tabs 50 shown in FIG. 4). Because the dummy tabs 50 protrude toward the outside of the cell 10 more than the first and second electrode tabs 30 and 40, the cell 10 may not generate excessive heat or catch on fire due to an approaching external conductor, which may form a short circuit with the first and second electrode tabs 30 and 40 and cause an excessive current through the cell 10. In addition, because the dummy tabs 50 protrude toward the outside of the cell 10 more than the first and second electrode tabs 30 and 40 (see, e.g., the protruding length P of the dummy tabs 50 shown in FIG. 4), a discharge current of the cell 10 flowing through an external conductor connected to the first and second electrode tabs 30 and 40 may be prevented, and thus, accidents such as an electric shock accident caused by an external conductor may be prevented.

Referring to FIG. 5, the dummy tabs 50 may be coupled to the second surface 10b of the cell 10 and may protrude in the second direction Z2 away from the second surface 10b toward the outside of the cell 10. The dummy tabs 50 may be formed on both sides of the second electrode tab 40, which is formed on the second surface 10b. For example, a pair of dummy tabs 50 may be formed on both sides of the second electrode tab 40. In an embodiment, the second electrode tab 40 may have an overall T-shape which extends in directions crossing each other, and different from the second electrode tab 40, the dummy tabs 50 may extend in the second direction Z2 and may have the same width.

The dummy tabs 50 may be provided as a pair on the second surface 10b of the cell 10 at both sides (e.g., opposite sides) of the second electrode tab 40. For example, the dummy tabs 50 may be provided as a pair on both sides of the second lead-out portion 45. For example, the dummy tabs 50 may be provided as a pair at positions spaced apart from both sides of the second lead-out portion 45 in the third direction Z3. As described above, the dummy tabs 50 may be provided as a pair on both sides of the second lead-out portion 45 at positions facing the second coupling portion 41. Fixing portions 42 may be formed on the second coupling portion 41 and may protrude in the second direction Z2 toward the dummy tabs 50 from positions of the second coupling portion 41 that face the dummy tabs 50. For example, the fixing portions 42 may protrude from both sides of the second lead-out portion 45, which extends from the second coupling portion 41. Thus, a pair of fixing portions 42 may be formed at both sides of the second lead-out portion 45. In an embodiment, the fixing portions 42 and the dummy tabs 50 may be paired at (e.g., may correspond with or be aligned with each other) both sides of the second lead-out portion 45, and each pair of the fixing portions 42 and the dummy tabs 50 may be arranged in a line in the second direction Z2 with a separation gap (g) therebetween. For example, a separation gap (g) may be formed in a dummy tab member extending in the second direction Z2 to divide the dummy tab member 42 and 50 into a fixing portion 42 and a dummy tab 50. For example, the dummy tabs 50 and the second electrode tab 40 including the fixing portions 42 may be formed from a single member including the second coupling portion 41 extending in the third direction Z3, the second lead-out portion 45 extending from the second coupling portion 41 in the second direction Z2, and dummy tab members (in which the dummy tabs 50 and the fixing portions 42 are connected to each other). Separation gaps (g) may be respectively formed in (or between) the dummy tab members 42 and 50 to separate the dummy tabs 50 from the fixing portions 42. In such an embodiment, each of the separation gaps (g) between the dummy tabs 50 and the fixing portions 42 may be formed in a line with the dummy tab 50 and the fixing portion 42 in the second direction Z2.

A fixing member 80 may be attached to the second surface 10b of the cell 10. The fixing member 80, which is for fixing the dummy tabs 50 to the second surface 10b of the cell 10, may extend across the dummy tabs 50 and attach the dummy tabs 50 to the second surface 10b. In various embodiments, however, the dummy tabs 50 may be welded to the second surface 10b of the cell 10 regardless of the fixing member 80. In such an embodiment, the dummy tabs 50 may be welded to the second surface 10b of the cell 10, and the fixing member 80 may be used to attach the dummy tabs 50 to the second surface 10b of the cell 10.

In an embodiment, the fixing member 80 may be attached across portions of the dummy tabs 50 and the second electrode tab 40 to fix the second electrode tab 40 together with the dummy tabs 50 such that the dummy tabs 50 may be more firmly attached to the second surface 10b of the cell 10. For example, the fixing member 80 may be attached across the dummy tabs 50 and the fixing portions 42, which are arranged in lines with the separation gaps (g) therebetween, and the second lead-out portion 45 arranged between the dummy tabs 50 and the fixing portions 42 on both sides thereof. Thus, the fixing member 80 may be attached to the second surface 10b of the cell 10 across portions of the dummy tabs 50, a portion of the second lead-out portion 45, and portions of the fixing portions 42.

In an embodiment, fixing members 80 may be attached to both sides in the first direction Z1 such that the portions of the dummy tabs 50, the portion of the second lead-out portion 45, and the portions of the fixing portions 42 may be between the fixing members 80. For example, an fixing member 80 in the first direction Z1 may be a double-sided adhesive member, and a lower fixing member 80 in the first direction Z1 may be a one-sided adhesive member.

In the illustrated embodiment, the fixing members 80 may connect together and support the dummy tabs 50, the second lead-out portion 45, and the fixing portions 42. For example, the fixing members 80 may connect the dummy tabs 50 together with the second lead-out portion 45 and the fixing portions 42, which protrude from the second coupling portion 41, fixed to the second surface 10b of the cell 10 by welding or the like such that the dummy tabs 50 may be firmly positioned. For example, the fixing members 80 may cover the dummy tabs 50 together with the fixing portions 42, which protrude from the second coupling portion 41 firmly fixed to the second surface 10b of the cell 10 by welding or the like, such that the fixing portions 42 and the dummy tabs 50 may be connected to each other through the fixing members 80 and the fixing of the dummy tabs 50 may be enhanced. Here, because the fixing portions 42 connect the second coupling portion 41 welded to the second surface 10b and the dummy tabs 50 through the fixing members 80, the fixing portions 42 may enhance the fixing of the dummy tabs 50. Similarly, because the fixing members 80 cover the dummy tabs 50 together with the second lead-out portion 45 extending from the second coupling portion 41 firmly fixed to the second surface 10b of the cell 10 by welding or the like, the second lead-out portion 45 and the dummy tabs 50 may be connected to each other through the fixing members 80, and the fixing of the dummy tabs 50 may be enhanced.

Referring to FIG. 4, the second electrode tab 40 and the dummy tabs 50 extend toward the outside of the cell 10 from the second surface 10b of the cell 10, and an outer end portion 40a of the second electrode tab 40 and outer end portions 50a of the dummy tabs 50 may be formed at different heights in the first direction Z1. For example, in an embodiment, the first electrode tab 30 may extend from the first surface 10a of the cell 10 generally at the same height as the first surface 10a of the cell 10, and the dummy tabs 50 may extend from the second surface 10b of the cell 10 generally at the same height as the second surface 10b of the cell 10. For example, an outer end portion 30a of the first electrode tab 30 may be at the same height as the first surface 10a of the cell 10, and the outer end portions 50a of the dummy tabs 50 may be at the same height as the second surface 10b of the cell 10. In such an embodiment, the second electrode tab 40 may extend along the second surface 10b of the cell 10 and then along the lateral surface 10c of the cell 10 in a region outside the second surface 10b by being bent in the first direction Z1 at a first bent portion 40b, and may form the outer end portion 40a between the first surface 10a and the second surface 10b by being bent in the second direction Z2 at a second bent portion 40d. In an embodiment, the first and second bent portions 40b and 40d may be formed together on the lateral surface 10c of the cell 10.

As described above, the outer end portion 30a of the first electrode tab 30, the outer end portion 40a of the second electrode tab 40, and the outer end portions 50a of the dummy tabs 50 are formed at different heights, and thus, the occurrence of a short circuit between the first and second electrode tabs 30 and 40 through an external conductor approaching the cell 10 may be effectively mitigated or prevented. In an embodiment, the dummy tabs 50 protrude toward the outside of the cell 10 more than the first and second electrode tabs 30 and 40 such that the first and second electrode tabs 30 and 40 may be prevented from being shorted by an external conductor. The outer end portion 30a of the first electrode tab 30, the outer end portion 40a of the second electrode tab 40, and the outer end portions 50a of the dummy tabs 50, which are exposed to the outside, are formed at different heights, and thus, a short circuit between the first and second electrode tabs 30 and 40 may be effectively mitigated or prevented. For example, even when an external conductor contacts the outer end portions 50a of the dummy tabs 50, which protrude the most (or farthest) from the cell 10, the first and second electrode tabs 30 and 40 formed at different heights from the dummy tabs 50 may not be shorted by the external conductor.

In an embodiment, the outer end portions 50a of the dummy tabs 50 may be at the same height in the first direction Z1 as the second surface 10b, which forms a lower portion (or lower surface) of the cell 10, that is, at a height at which an external conductor placed on a floor on which the cell 10 is supported is likely to contact the outer end portions 50a of the dummy tabs 50. For example, the heights of the outer end portions 50a of the dummy tabs 50 may be set such that the outer end portions 50a of the dummy tabs 50 may be more likely to come into contact with an external conductor than at least the outer end portions 30a and 40a of the first and second electrode tabs 30 and 40.

In an embodiment, the lateral surface 10c of the cell 10 may be formed in such a manner that a portion of the lateral surface 10c on the side of the first surface 10a (e.g., the lateral surface 10c of the insulating cap 20) protrudes more than a portion of the lateral surface 10c on the side of the second surface 10b due to the insulating cap 20 on the first surface 10a. In such an embodiment, the outer end portions 30a, 40a, and 50a of the first electrode tab 30, the second electrode tab 40, and the dummy tabs 50 may extend parallel with each other in the second direction Z2 and may protrude toward the outside of the cell 10 more than the relatively protruding portion of the lateral surface 10c of the cell 10 (e.g., the insulating cap 20) on the side of the first surface 10a. In addition, portions of the second electrode tab 40, such as the first bent portion 40b and the second bent portion 40d of the second electrode tab 40, may be arranged as a stepped portion between the side of the first surface 10a (e.g., of the insulating cap 20) and the side of the second surface 10b of the cell 10. The portion of the second electrode tab 40 extending along the lateral surface 10c of the cell 10 may be protected owing to the stepped portion of the lateral surface 10c of the cell 10. In such an embodiment, the dummy tabs 50 may be arranged on the second surface 10b of the cell 10 together with the second electrode tab 40 extending along the lateral surface 10c of the cell 10. Because the dummy tabs 50 are formed on the second surface 10b of the cell 10 together with the second electrode tab 40 leaning on the lateral surface 10c of the cell 10, the dummy tabs 50 may be stably supported owing to the second electrode tab 40, which is firmly fixed. The dummy tabs 50 may be connected to the second electrode tab 40 through the fixing member 80 and may be formed on the second surface 10b together with the second electrode tab 40, which is more firmly fixed by the lateral surface 10c than the first electrode tab 30, which is not supported by the lateral surface 10c, such that the positions of the dummy tabs 50 may be more firmly fixed. For example, rather than the dummy tabs 50 being formed on the first surface 10a together with the first electrode tab 30 connected to the first electrode 11 formed at the center position of the first surface 10a, the dummy tabs 50 may be formed on the second surface 10b together with the second electrode tab 40 connected to the second electrode 12, which is formed on the entirety of the second surface 10b and the entirety of the lateral surface 10c and extends from the lateral surface 10c to a peripheral region surrounding the center position of the first surface 10a. In such an embodiment, the second electrode tab 40 may provide a sufficient conduction (or conductive) area connected to the second electrode 12 through the second surface 10b and the lateral surface 10c of the cell 10 and may be stably positioned while leaning on (e.g., contacting) the lateral surface 10c of the cell 10. In addition, the second electrode tab 40 may firmly fix the positions of the dummy tabs 50 through the fixing member 80.

As described above, according to embodiments of the present disclosure, the battery is configured to prevent the formation of a short circuit between the first and second electrodes 11 and 12 to prevent the occurrence of accidents, such as an overcurrent, overheating, and fire.

It should be understood that the embodiments described herein should be considered in a descriptive sense and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims and their equivalents.

What is claimed is:
1. A battery comprising:
   a cell comprising a first electrode and a second electrode;
   an electrode tab connected, via its proximal end, to one of the first electrode and the second electrode; and an electrically conductive dummy tab connected, via its proximal end, to the cell and protruding outwardly from the cell farther than the electrode tab, wherein a distal end of the electrode tab is spaced apart from the dummy tab.

2. The battery of claim 1, wherein the first electrode is on a first surface of the cell, and wherein the second electrode is on a second surface of the cell, the first and second surfaces being opposite each other in a first direction.

3. The battery of claim 2, wherein the electrode tab is a first electrode tab connected to the first electrode, and wherein the cell further comprises a second electrode tab connected to the second electrode.

4. The battery of claim 3, wherein the dummy tab protrudes outwardly from the cell farther than the first and second electrode tabs.

5. The battery of claim 3, wherein the dummy tab extends parallel with the first and second electrode tabs in a second direction crossing the first direction, and wherein the dummy tab protrudes outwardly from the cell in the second direction farther than the first and second electrode tabs.

6. The battery of claim 3, wherein the dummy tab is on at least one of the first surface and the second surface.

7. The battery of claim 6, wherein the dummy tab is on the first surface or the second surface together with the first electrode tab or the second electrode tab.

8. The battery of claim 3, wherein the first electrode is at a center position of the first surface, and wherein the second electrode is entirely on the second surface and a lateral surface extending between the first and second surfaces and extends from the lateral surface to a peripheral region extending around a periphery of the center position of the first surface.

9. The battery of claim 8, wherein the dummy tab is on the second surface together with the second electrode tab.

10. The battery of claim 3, wherein the first and second electrode tabs and the dummy tab each has an outer end portion respectively provided at different heights in the first direction.

11. The battery of claim 10, wherein the outer end portion of the second electrode tab is at a height between the outer end portion of the first electrode tab and the outer end portion of the dummy tab in the first direction.

12. The battery of claim 10, wherein the outer end portions of the first and second electrode tabs and the dummy tab protrude outwardly from the cell in parallel with each other.

13. The battery of claim 10, wherein the second electrode tab comprises:

a first bent portion bent at a position away from the second surface along a lateral surface of the cell in the first direction toward the first surface; and a second bent portion on the lateral surface of the cell together with the first bent portion and bent in a second direction to form the outer end portion of the second electrode tab at a height between the first surface and the second surface.

14. The battery of claim 3, wherein the first and second electrode tabs respectively comprise: first and second coupling portions coupled to the first and second surfaces; and first and second lead-out portions extending outwardly from the cell from the first and second coupling portions.

15. The battery of claim 14, wherein the first and second coupling portions and the first and second lead-out portions extend in different directions.

16. The battery of claim 14, wherein the dummy tab comprises a pair of dummy tabs provided on both sides of the second lead-out portion.

17. The battery of claim 14, wherein the dummy tab and the second lead-out portion of the second electrode tab extend parallel to each other, and wherein the dummy tab is shorter than the second lead-out portion.

18. The battery of claim 14, wherein the dummy tab is on the second surface of the cell together with the second electrode tab, and wherein the second electrode tab further comprises a fixing portion protruding from the second coupling portion toward the dummy tab.

19. The battery of claim 18, wherein the dummy tab and the fixing portion are arranged in a line, and wherein the dummy tab and the fixing portion are separated by a separation gap.

20. The battery of claim 18, wherein the dummy tab is fixed to the second surface of the cell by a fixing member, the fixing member being attached to the second surface across a portion of the dummy tab, a portion of the second lead-out portion, and a portion of the fixing portion.

21. A battery comprising:

a cell comprising a first electrode on a first surface of the cell and a second electrode on a second surface of the cell, the first and second surfaces being opposite each other in a first direction;

a first electrode tab connected to the first electrode;

a second electrode tab connected to the second electrode; and a dummy tab protruding outwardly from the cell farther than the first electrode tab, wherein the first and second electrode tabs and the dummy tab each has an outer end portion respectively provided at different heights in the first direction.

22. The battery of claim 21, wherein the outer end portion of the second electrode tab is at a height between the outer end portion of the first electrode tab and the outer end portion of the dummy tab in the first direction.

23. The battery of claim 21, wherein the outer end portions of the first and second electrode tabs and the dummy tab protrude outwardly from the cell in parallel with each other.

24. The battery of claim 21, wherein the second electrode tab comprises:

a first bent portion bent at a position away from the second surface along a lateral surface of the cell in the first direction toward the first surface; and a second bent portion on the lateral surface of the cell together with the first bent portion and bent in a second direction to form the outer end portion of the second electrode tab at a height between the first surface and the second surface.

25. A battery comprising:

a cell comprising a first electrode on a first surface of the cell and a second electrode on a second surface of the cell, the first and second surfaces being opposite each other in a first direction;

a first electrode tab connected to the first electrode;

a second electrode tab connected to the second electrode; and a dummy tab protruding outwardly from the cell farther than the first electrode tab, wherein the first and second electrode tabs respectively comprise:

first and second coupling portions coupled to the first and second surfaces; and first and second lead-out portions extending outwardly from the cell from the first and second coupling portions, and wherein the dummy tab comprises a pair of dummy tabs provided on both sides of the second lead-out portion.

26. The battery of claim 25, wherein the dummy tab and the second lead-out portion of the second electrode tab extend parallel to each other, and wherein the dummy tab is shorter than the second lead-out portion.

27. The battery of claim 25, wherein the dummy tab is on the second surface of the cell together with the second electrode tab, and wherein the second electrode tab further comprises a fixing portion protruding from the second coupling portion toward the dummy tab.

28. The battery of claim 27, wherein the dummy tab and the fixing portion are arranged in a line, and wherein the dummy tab and the fixing portion are separated by a separation gap.

29. The battery of claim 27, wherein the dummy tab is fixed to the second surface of the cell by a fixing member, the fixing member being attached to the second surface across a portion of the dummy tab, a portion of the second lead-out portion, and a portion of the fixing portion.

* * * * *